Patented Mar. 7, 1939

2,149,577

UNITED STATES PATENT OFFICE 2,149,577

DISTILLATE OIL FROM STILL RESIDUES

William H. Carmody, Pittsburgh, Pa., assignor to The Neville Company, a corporation of Pennsylvania No Drawing. Application June 17, 1936, Serial No. 85,747

2 Claims. (Cl. 196—75)

This invention relates to the recovery of useful products from still residue resultant from the treatment of light oils derived from coal-coking ovens, and particularly to the recovery of a useful solvent oil from such still residue.

During the recovery of aromatic oils from coke-oven gases, it is customary to scrub the gases with a mineral oil in order to extract the aromatic oils contained in the gases. By this scrubbing the mineral oil becomes charged with such solvents as benzol, toluol, xylol, and the crude naphthas. After scrubbing, the aromatic content taken up by the mineral oil is volatilized away from the mineral scrubbing, or wash, oil. The recovered aromatics form coke-oven light oil. After separation of the lighter aromatics of the light oil from the crude solvent naphthas, the lighter aromatics are subjected to purification and to distillation. There remains in the several stills a still residue having its derivation in the coke-oven light oil.

This still residue from coke-oven light oil is a dark viscous material of a sirupy consistency. Apparently it is a dispersed mixture of resins in oils, and of a colloidal nature. It possesses in its complete form and natural condition substantially no utility in the arts.

In order to recover valuable products from such still residue, I initially subject the still residue to a distillation and blowing treatment with live steam. In so doing, the still residue is heated sufficiently to elevate its temperature to a point at which it is thin and free flowing. Desirably, the temperature is raised to a point substantially above 250° C., such as a temperature within a range of 275° C. to 280° C. By blowing live steam through the still residue, while maintaining it at such elevated temperature, the oily content of the still residue is carried over, and may be collected in association with water condensed from the steam.

There remains residually after the oil content of the still residue has been carried over a solid residuum in a quantity approximating 40% the weight of the initial still residue. This solid residum is a hard, black, resin-like material of a brittle nature. When care has been taken to remove a maximum proportion of the initially associated oil, a solid residuum having a melting-point as high as 107° C. has been obtained. This solid residual material is readily and completely soluble in aromatic solvents such as benzol, toluol, and the solvent naphthas. In petroleum benzine, however, it disintegrates rapidly to give a reddish-amber solution and a flocculent precipitate. Apparently this solid residuum is in degree alcohol soluble, since a moderate quantity of alcohol may be added to a benzene solution of the residuum without causing precipitation. Addition of a relatively large proportion of alcohol to a benzene solution of the residuum serves, however, to produce a cloudiness which on standing coagulates into a definite precipitation.

This resin-like residuum has certain distinctive qualities. For example, it shows upon breakage a peculiar grain-like structure not commonly found in pitches or resins. It is capable of taking a high polish, and is usable as a carnauba wax substitute in floor polishes, or the like. It is usable as a sealing agent for the tops of dry cells, and may be used for that and similar electrical purposes. It is compatible with coumarone-indene resins, and may be modified by admixture with those resins for certain purposes, as for the sealing of electrical dry cells, and the like.

The remaining 60% of the initial still residue is then oil distilled and blown off as above described. This oil, as initially recovered, being thoroughly commingled with water, it is necessary that it be dried before fractionation. The procedure in separating this residual oil from the water from which it is associated requires distinctive procedure, for the reason that the oil has a specific gravity very close to the specific gravity of water at normal room temperature, and a separation by merely permitting settling of the diverse liquids is not, therefore, effective. My procedure is to heat the mixed oil and water to a temperature approaching the boiling point of the water, such as a temperature of from 90° C. to 95° C., and then permitting the mixture to stand and settle. For some reason, probably that the oil has a higher coefficient of expansion than water, the oil and water rapidly stratify at that temperature, and the hot water may be drawn away from beneath the layer of oil.

When removal of water has been approximated by heating and stratification, the last traces of water are removed by raising the temperature of the oil to a point above the boiling point of water and below 150° C. By so doing, the water distills over, carrying with it a small quantity of low-boiling, light-gravity distillate from the oil.

As thus dehydrated, the residual oil is of a reddish color, and gives off a strong odor of sulphur. In order to neutralize and purify the dehydrated oil, I charge it into a still, and add to it an alkaline reagent such as sodium hydroxide, in most instances using sufficient of reagent to give an alkalinity equal to that obtained by adding sodium hydroxide in a proportion of from 3% to 5% the weight of the oil.

The residual oil is then fractionated from the caustic still either at atmospheric pressure or under a slight degree of subatmospheric pressure. By this fractionation I have obtained various cuts of oil having certain utilities. Apparently in the entire body of residual oil the components thereof belong to the same system of hydrocarbons, and the cuts or fractions hereinafter described are therefore primarily arbitrary. It is, however, a distinguishing feature of this oil that the higher boiling fractions of it retain in large measure the solvent power of the lower boiling fractions. Apparently the oil, taken as a whole, provides in its higher boiling fractions the higher range of hydrocarbon solvents which have not previously been isolated in commercial practice, but which previously have existed merely as produced by synthesis and by a scientific rather than a commercial procedure.

The fractions to be described thus represent primary cuts taken within ranges which adapt each fraction particularly to some use, and when distillation range is given are to be considered proximate rather than absolute. There is, however, in the major higher boiling cut the quality of higher solvent power with respect to the boiling point and specific gravity of the fraction.

By fractionation of the residual oil, I have obtained, as preliminary runnings, a cut boiling within the approximate range of 150° C. to 200° C., which represents approximately 10% of the total volume of recovered and dehydrated oil. This cut has a sharp characteristic odor resembling benzol forerunnings and cyclopentadiene. In certain respects it resembles crude solvent naphtha, being initially pale amber in color, and darkening upon standing. It does not possess, however, any tendency toward polymerization, and in that sense is to be considered to be a refined rather than a crude material. It has high solvent power for resins, for drying oils, and the like. The next oil fraction which I have taken comes over within the approximate boiling range of 200° C. to 250° C. This fraction of the residual oil possesses a characteristic odor which is sour or musty as compared with the sharp odor of the preliminary runnings. It has a relatively low specific gravity, separating readily from water at normal atmospheric temperature. This cut, which comprises approximately 15% the original volume of the dehydrated residual oil, is in all respects, save in its volatility and viscosity, identical with the higher boiling cut immediately hereinafter to be described. Its higher volatility, however, renders the inclusion of any substantial proportion of it in the following cut undesirable for certain of the uses to which the heavier cut possesses peculiar adaptability.

The next cut of the residual oil possesses distinction in that it is within the relatively narrow boiling range of approximately 275° C. to 300° C., and comprises approximately 60% the volume of the total initial dehydrated oil. This fact is so marked that it seems proper to consider this cut primarily as the residual oil, considering the lower boiling and higher boiling fractions, respectively, as preliminary runnings and after-runnings associated with its recovery. This oil is of a light amber color and has a specific gravity of approximately 0.98. It has an aniline point of 26° C., which is closely analogous to the aniline point of refined solvent naphtha and similar aromatic solvents. For purposes of comparison it may be stated that the petroleum solvent kerosene boiling within the same approximate range has an aniline point approximating 60° C. The solvent power of this relatively high boiling oil is not greatly less than the solvent power of the preliminary runnings boiling within the range of from 150° C. to 200° C.

The last fraction of the residual oil comes over in the boiling range of from 300° C. to 360° C., and decomposes at the latter temperature. It represents the remaining portion of the initial dehydrated residual oil. It is very viscous and possesses good solvent power with respect to its boiling range and viscosity. It possesses in many respects the qualities of a heavy oil consisting of the dimers of coumarone and indene, and may be used as a plasticizer in certain of the less liquid coating compositions. It is compatible with coumarone-indene resins, with ester gums, and with most of the other resins, both synthetic and natural.

Returning to the fractionation of residual oil boiling within the approximate range of 275° C. to 300° C., which constitutes approximately 60% the initial volume of the oil, and which I consider primarily to be the residual oil, this oil because it joins within itself the qualities of high solvent power and relatively low volatility is peculiarly adaptable to a wide variety of uses. For example, the fact that this oil is relatively non-evaporative renders it a valuable constituent of printer's inks in which previously petroleum derivatives have been unsatisfactorily used or in which there have been used relatively expensive synthetically produced oils. As a constituent of printer's ink the high solvent power of the oil is of importance, in that it is capable of retaining in solution resins, drying oils, and dyes which provide other constituents of the ink.

For other uses advantage may be taken of the unusual joinder of qualities of this oil. Whereas benzol, for example, has high solvent power, and evaporates so rapidly from the composition in which it is included that it is to be considered solely as an evaporative solvent. This non-evaporative solvent oil is capable of remaining in the composition, such as a coating composition, to form wholly or partially a permanent component of the composition. It thus has wide applicability to compositions in which slow drying qualities are of importance, and in compositions in which a solvent of substantially non-evaporative sort is desirable to impart added adhesive qualities to the composition.

This product, namely the oil distilling within the approximate range of 275° C. to 300° C., has such strikingly individual and valuable qualities that it is in fact to be considered the primary product of the treatment, and the other recoverable products both solid and oily may be considered as by-products of a treatment for its recovery. From the commercial viewpoint, its sole recovery, other products being discarded, may profitably be practiced.

I claim as my invention:

1. As a material of commerce the herein described aromatic solvent oil having its derivation in still residue from the treatments of separation and purification conducted in light oil recovered from coal-coking ovens for use as a non-evaporative solvent in printer's ink and like compositions, said oil distilling within the approximate range of 275° C. to 300° C. having a specific gravity of approximately 0.98 and having an aniline point about 26° C.

2. The herein described method of recovering useful products from still residue derived from treatments of separation and purification conducted in light oil recovered from coal-coking ovens which comprises separating the volatile content of the still residue by blowing live steam through the still residue heated to a temperature substantially above 250° C. adequate to render it thin and free flowing, resultantly to obtain as the volatile content of the still residue a distillate aromatic solvent oil distilling within the approximate range of 150° C. to 360° C. and a hard resin-like residuum as the non-volatile content of the still residue, separating the distillate oil from condensate water by heating the mixed oil and water to a temperature approximating 90° C. and by settling and decantation, purifying the oil so dehydrated, and recovering therefrom the fraction boiling within the approximate range of 275° C. to 300° C.

WILLIAM H. CARMODY.